Jan. 26, 1937.  D. K. BADERTSCHER  2,068,901
VEHICLE STEERING MECHANISM
Filed Nov. 16, 1935

Inventor:
Dana K. Badertscher.
By Dike, Calvert & Gray
Attorneys.

Patented Jan. 26, 1937

2,068,901

UNITED STATES PATENT OFFICE 2,068,901

VEHICLE STEERING MECHANISM

Dana K. Badertscher, Detroit, Mich., assignor to Hudson Motor Car Company, Detroit, Mich., a corporation of Michigan Application November 16, 1935, Serial No. 50,108

11 Claims. (Cl. 280—95)

When an automobile is moving in a curved path, the action of centrifugal force tilts the sprung weight about its longitudinal neutral axis, or an axis corresponding substantially thereto, and at the same time weight is transferred to the outer wheels, causing the outer wheels, due to the compression of the tires, to assume a smaller rolling radius than the inner wheels. Consequently, the vehicle tends to proceed along an arc having its center on the apex of an angle formed by intersecting lines in a vertical plane connecting the respective ends of the effective rolling diameters of the front wheels. Substantially the same conditions exist, tending to cause the vehicle to deviate from a desired direction of travel, when the vehicle is subjected to side pressure due to a cross wind.

The driver of a vehicle must steer the front wheels to compensate for these conditions. Effecting this correction, in addition to being a burden upon the driver, causes considerable trouble when the lateral force or pressure is removed, as when the vehicle passes objects which shield it from the action of the wind, and results in momentary loss of control of the vehicle inasmuch as the correction is still in effect. This is possibly the most unpleasant condition with which a driver has to contend and in some cases results in serious accidents.

It is an object of the present invention to provide means for effecting an automatic correction for such conditions.

This and other objects of the invention will be more clearly understood from the following description in conjunction with the accompanying drawing in which, Fig. 1 is a diagrammatic plan view of the front portion of a vehicle embodying the invention;

Figure 1:
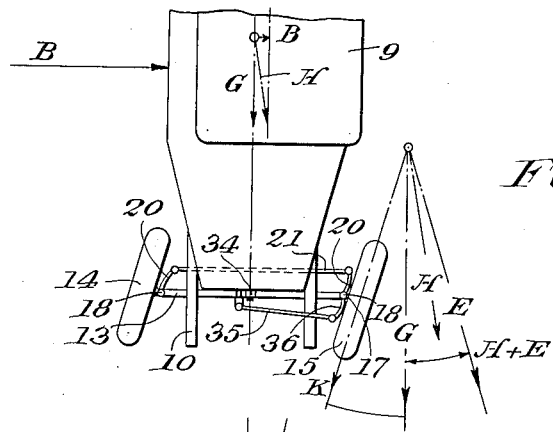

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

One embodiment of the invention is illustrated in the accompanying drawing and comprises a body 9 carried by a chassis frame 10 which is supported by springs 11 and 12 upon an axle 13. Dirigible wheels 14 and 15 are mounted for rotation upon spindles carried by steering knuckles 16 and 17 respectively which are pivotally mounted upon king pins 18 carried by each end of the axle 13 to turn to permit steering of the vehicle. The steering knuckles 16 and 17 are provided with rigid arms 20, the ends of which are pivotally connected by a tie rod 21.

Steering of the vehicle is effected by a steering mechanism comprising a hollow casing 25 suitably secured to the frame 10 by bolts 26. The usual steering post 27 is mounted for rotation in suitable bearings in the casing 25 and is connected by conventional mechanism to a shaft 28 mounted for rotation in suitable bearings in the casing 25. An arm 29 is keyed at one end to the outer end of the shaft 28 and is connected at the other end by a universal connection 30 to one end of a link 31. The other end of the link 31 is connected by a universal connection 32 to one end of an arm 33 which is pivotally carried at an intermediate point by a longitudinally extending stud 34 fixed upon the frame 10. The other end of the arm 33 is connected by a universal connection to one end of a link 35, the other end of which is connected by a universal connection to the end of an arm 36 fixed to the steering knuckle 16.

The point of connection $x$ of the arm 33 with the link 35 is offset from the longitudinally neutral axis F about which the body tilts when subjected to lateral forces, being, as herein shown, below the same. Consequently, when the body tilts about the axis F, the point $x$ will also move in an arc about said center, and the movement imparted to the steering knuckles through the link 35 will be the algebraic sum of the movements imparted to the point $x$ through the steering gear and as the result of said tilting movement, respectively.

If it is assumed that the vehicle is travelling in the direction indicated by the arrow G, Fig. 1, and is subjected to a side pressure, such as a cross wind as indicated by the arrow B, the direction of movement of the vehicle will tend to be deviated from the direction indicated by the arrow G to that indicated by the arrow H which is the direction of the component of the side force B and the propelling force G.

Figure 2:
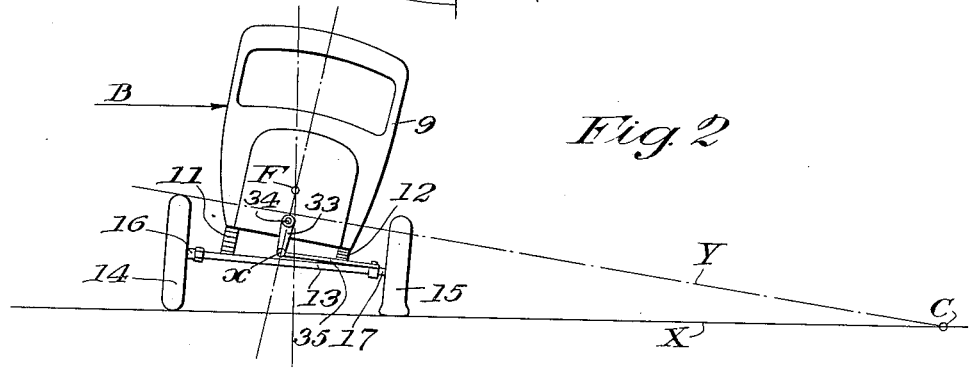
Fig. 2 is a front elevational view of the same.
Figure 3:
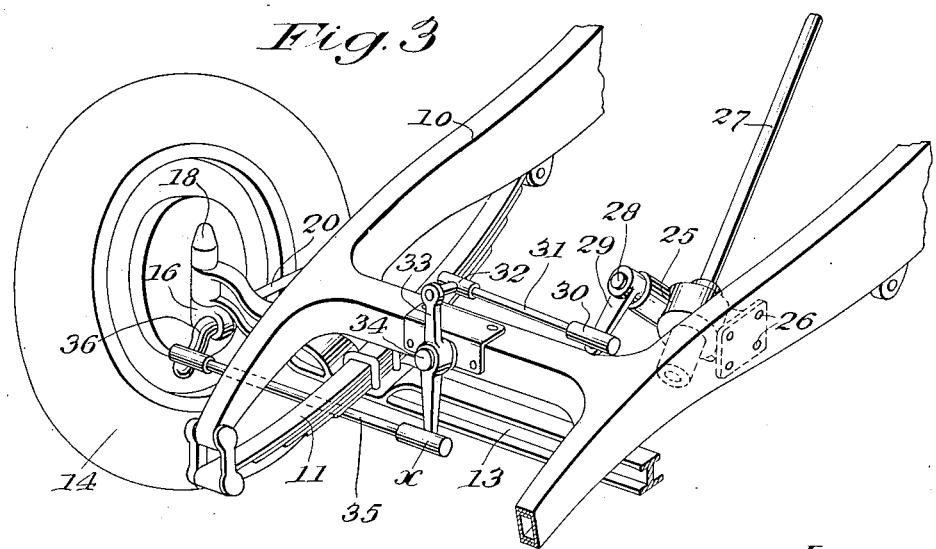
Fig. 3 is a fragmentary detail perspective view of the front portion of a vehicle embodying the invention.

As a result of the action of the side force B the sprung weight, comprising the body 9 and the chassis frame 10, will be turned about an axis F, corresponding substantially to the longitudinal neutral axis of the sprung weight as indicated in Fig. 2. This increases the weight carried by the spring 12 and the wheel 15 and decreases the weight carried by the spring 11 and the wheel 14 and, consequently, reduces the effective rolling radius of the dirigible wheel 15 and increases the effective rolling radius of the dirigible wheel 14. Consequently, the vehicle will tend to turn about an arc having as its center the point C which is the point of intersection of the lines X and Y which lie in a vertical plane and connect the effective rolling diameters of the wheels 14 and 15. This tendency of the vehicle to move along an arc having the point C as its center will tend to deviate the vehicle further from the desired direction of travel and in a direction as indicated by the arrow E in Fig. 1.

Thus, in order to correct for these conditions tending to deviate the vehicle from its desired direction of travel, it has been necessary, heretofore, for the driver of the vehicle to oversteer by turning the front wheels at an angle to arrow line K substantially equal to the angle between the arrows E and G. When the side pressure B is removed, the vehicle will move in the direction indicated by the arrow K until the wheels 14 and 15 are turned to steer the vehicle in the desired direction of travel as indicated by the arrow G.

In accordance with the provisions of the invention, when a vehicle is subjected to a force tending to deviate the vehicle from the desired direction of travel, the vehicle is steered automatically to oppose the deviation and is steered automatically to maintain the desired direction of travel when the force is removed. Thus, when the vehicle is subjected to side pressure, as indicated by the arrow B in Fig. 2, which results in tilting and laterally displacing the sprung portion relative to the unsprung portion, the arm 33 is caused to move with the sprung portion and moves the link 35 laterally to turn the wheels 14 and 15 in a direction as indicated in Fig. 1 to oppose the tendency of the vehicle to move in the direction as indicated by the arrow E. When the side pressure is removed and the sprung portion moves in the opposite direction relative to the unsprung portion, the arm 33 moves with the sprung portion and causes the wheels 14 and 15 to turn to steer the vehicle in the desired direction of travel as indicated by the arrow G in Fig. 1.

Sprung portion is intended to include all portions of the vehicle which are supported by the springs 11 and 12 and the unsprung portion is intended to include all other portions of the vehicle.

I claim:

1. A motor vehicle comprising sprung and unsprung portions, said unsprung portion including road wheels adapted to be turned to steer the vehicle, and means operative, when said vehicle is subjected to a force changing the relations between the sprung and unsprung portions of the vehicle thus tending to deviate the vehicle from a desired direction of travel, to turn said wheels a given amount to steer the vehicle to oppose said deviation and operative, when said force is removed, to turn said wheels said given amount in the opposite direction.

2. A motor vehicle comprising sprung and unsprung portions, said unsprung portion including road wheels adapted to be turned to steer the vehicle, and means operative, when said vehicle is subjected to a force changing the relation between the sprung and unsprung portions of the vehicle thus tending to deviate the vehicle from a desired direction of travel, to turn said wheels a given amount to steer the vehicle to oppose said deviation and operative, when said force is removed, to turn said wheels said given amount in the opposite direction, said means including a link operatively connecting said wheels with the sprung portion at a point offset from the longitudinal neutral axis of the latter.

3. A motor vehicle comprising sprung and unsprung portions, said unsprung portion including road wheels adapted to be turned to steer the vehicle, and means operative, when said vehicle is subjected to a force changing the relation between the sprung and unsprung portions of the vehicle thus tending to deviate the vehicle from a desired direction of travel, to turn said wheels a given amount to steer the vehicle to oppose said deviation and operative, when said force is removed, to turn said wheels said given amount in the opposite direction, said means including a connection between said wheels and the sprung portion at a point offset from the longitudinal neutral axis of the latter.

4. A motor vehicle comprising sprung and unsprung portions, said unsprung portion including road wheels adapted to be turned to steer the vehicle, and steering mechanism for turning said wheels to steer the vehicle, said mechanism having means operative, when said vehicle is subjected to a force tending to change the angular relation between the sprung and unsprung portions of the vehicle thereby tending to deviate the vehicle from a desired direction of travel, to turn said wheels a given amount to steer the vehicle to oppose said deviation and operative, when said force is removed, to turn said wheels said given amount in the opposite direction.

5. A motor vehicle comprising sprung and unsprung portions, said unsprung portion including road wheels adapted to be turned to steer the vehicle, and steering mechanism for turning said wheels to steer the vehicle, said mechanism having means operative, when said vehicle is subjected to a force tending to change the angular relation between the sprung and unsprung portions of the vehicle thereby tending to deviate the vehicle from a desired direction of travel, to turn said wheels a given amount to steer the vehicle to oppose said deviation and operative, when said force is removed, to turn said wheels said given amount in the opposite direction, said means including a link operatively connecting said wheels with the sprung portion at a point offset from the longitudinal neutral axis of the latter.

6. A motor vehicle comprising sprung and unsprung portions, said unsprung portion including road wheels adapted to be turned to steer the vehicle, and steering mechanism for turning said wheels to steer the vehicle, said mechanism having means operative, when said vehicle is subjected to a force tending to change the angular relation between the sprung and unsprung portions of the vehicle thereby tending to deviate the vehicle from a desired direction of travel, to turn said wheels a given amount to steer the vehicle to oppose said deviation and operative, when said force is removed, to turn said wheels said given amount in the opposite direction, said means including an arm pivotally carried by said sprung portion, and a link operatively connecting said wheels with said arm at a point offset from the longitudinal neutral axis of said sprung portion.

7. A motor vehicle comprising sprung and unsprung portions, said unsprung portion including road wheels adapted to be turned to steer the vehicle, and means operative, when said vehicle is subjected to a force tending to change the angular relation between the sprung and unsprung portions of the vehicle thereby tending to deviate the vehicle from a desired direction of travel, to turn said wheels a given amount to steer the vehicle to oppose said deviation and operative, when said force is removed, to turn said wheels said given amount in the opposite direction, said means including an arm pivotally carried by said sprung portion, and a link operatively connecting said wheels with said arm at a point offset from the longitudinal neutral axis of said sprung portion.

8. A motor vehicle comprising sprung and unsprung portions, dirigible road wheels constituting a part of the unsprung portion, and means controlled by lateral forces tending to roll or tilt the sprung portion on the unsprung portion for turning said wheels to steer the vehicle in a direction opposite that of said displacement.

9. A motor vehicle comprising sprung and unsprung portions, dirigible road wheels constituting a part of the unsprung portion, and means controlled by lateral tilting or rolling movement of the sprung portion on the unsprung portion for turning said wheels to steer the vehicle in a direction opposite that of said displacement, said means including a connection between said wheels and the sprung portion at a point offset from the longitudinal neutral axis of the latter.

10. A motor vehicle comprising sprung and unsprung portions, dirigible road wheels constituting a part of the unsprung portion, and means controlled by lateral tilting or rolling movement of the sprung portion on the unsprung portion for turning said wheels to steer the vehicle in a direction opposite that of said displacement, said means including a link operatively connecting said wheels with the sprung portion at a point offset from the longitudinal neutral axis of the latter.

11. A motor vehicle comprising sprung and unsprung portions, said sprung portions being adapted to tilt on said unsprung portion about a longitudinal axis under the influence of lateral forces, and said unsprung portion including road wheels adapted to be turned to steer the vehicle, and steering mechanism for turning said wheels, said steering mechanism including a steering post carried by said sprung portion, a steering arm mounted on said sprung portion to swing transversely of the vehicle and operatively connected with said steering post for operation thereby, and a transversely disposed drag link operatively connecting said arm and wheels, said drag link being connected to said arm at a point offset from the tilting axis of said sprung portion.

DANA K. BADERTSCHER.